US010829171B2

(12) United States Patent
Parrott

(10) Patent No.: US 10,829,171 B2
(45) Date of Patent: Nov. 10, 2020

(54) SPRING-BASED MAGNETIC ATTACHMENT METHOD FOR CRAWLING VEHICLE

(71) Applicant: Saudi Arabian Oil Company, Dhahran (SA)

(72) Inventor: Brian M. Parrott, Thuwal (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 201 days.

(21) Appl. No.: 16/017,546

(22) Filed: Jun. 25, 2018

(65) Prior Publication Data

US 2019/0241223 A1 Aug. 8, 2019

Related U.S. Application Data

(60) Provisional application No. 62/626,979, filed on Feb. 6, 2018.

(51) Int. Cl.
*B62D 57/024* (2006.01)
*H01F 7/02* (2006.01)

(52) U.S. Cl.
CPC ......... *B62D 57/024* (2013.01); *H01F 7/0252* (2013.01)

(58) Field of Classification Search
CPC ............................ B62D 57/024; H01F 7/0252
See application file for complete search history.

(56) References Cited

U.S. PATENT DOCUMENTS

| | | | |
|---|---|---|---|
| 3,777,834 A | 12/1973 | Hiraoka et al. | |
| 3,999,423 A * | 12/1976 | Tyree ................... | G01N 29/265 73/635 |
| 4,789,037 A | 12/1988 | Kneebone | |
| 5,366,038 A | 11/1994 | Hidetsugu et al. | |
| 5,894,901 A * | 4/1999 | Awamura ............. | B62D 55/265 180/9.54 |
| 5,947,051 A | 9/1999 | Geiger | |
| 6,011,455 A * | 1/2000 | Higuti ................... | B62D 57/024 335/223 |
| 7,624,827 B2 | 12/2009 | Moser et al. | |
| 8,567,536 B1 | 10/2013 | Canfield et al. | |
| 9,038,557 B2 | 5/2015 | Smith | |

(Continued)

FOREIGN PATENT DOCUMENTS

| CN | 205819364 U | 12/2016 |
|---|---|---|
| CN | 206824868 U | 1/2018 |

(Continued)

OTHER PUBLICATIONS

Examination Report in Corresponding Gulf Coast Application No. 2019-36947 dated Jul. 14, 2020. 5 pages.

*Primary Examiner* — Tony H Winner
*Assistant Examiner* — Marlon A Arce
(74) *Attorney, Agent, or Firm* — Leason Ellis LLP

(57) ABSTRACT

A vehicle for traversing a surface using magnetic attachment is provided. The vehicle includes a chassis body and wheels attached to the chassis body. At least one magnetic module is attached via a resilient member to the chassis body. Each magnetic module includes a magnet and an offset member that provides an approximately constant offset between the surface and the magnet. The resilient member transfers a magnetic attractive force that is normal to the surface between the magnetic attracting module and the chassis body. The vehicle can traverse uneven surfaces without magnetically decoupling.

28 Claims, 4 Drawing Sheets

(56) References Cited

U.S. PATENT DOCUMENTS

| | | |
|---|---|---|
| 9,096,283 B2 | 8/2015 | Albin et al. |
| 9,428,231 B2 | 8/2016 | Beard et al. |
| 2008/0308324 A1 | 12/2008 | Moser et al. |
| 2011/0174565 A1 | 7/2011 | Rochat et al. |
| 2012/0116583 A1 | 5/2012 | Beard et al. |
| 2014/0077587 A1* | 3/2014 | Smith ............... G05D 1/00 305/15 |

FOREIGN PATENT DOCUMENTS

| | | |
|---|---|---|
| EP | 0878381 A1 | 11/1998 |
| EP | 1886904 A2 | 2/2008 |
| JP | S61200070 A | 9/1986 |
| JP | H06126660 A | 5/1994 |
| JP | H08295272 A | 11/1996 |

* cited by examiner

SPRING-BASED MAGNETIC ATTACHMENT METHOD FOR CRAWLING VEHICLE

CROSS-REFERENCE TO RELATED APPLICATIONS

This application claims priority under 35 U.S.C. § 119 to U.S. Provisional Application Ser. No. 62/626,979, filed Feb. 6, 2018, which is hereby incorporated by reference in its entirety.

FIELD OF THE INVENTION

A system, method, and device for providing an attractive force, for example, between a vehicle traversing a surface using resiliently-biased magnetic attachment.

BACKGROUND OF THE INVENTION

Vehicles are required to traverse surfaces in which it is desirable to increase the traction between the vehicle and the surface being traversed, especially in vertical and inverted orientations. A suitable vehicle can be a robotic vehicle, such as robotic vehicle configured to perform inspection, testing, maintenance, or other tasks. The robotic vehicle can be deployed to, for example, inspect various structures such as pipelines, storage tanks, other infrastructure, etc. Many of the structures include ferromagnetic materials, such as steel, iron based structures, etc. Accordingly, inspection or other operations can be performed on these structures using vehicles that include magnets that provide attractive force between the vehicle and the structure being traversed by the vehicle. The magnets provide an attractive force sufficient to maintain friction between the vehicle wheels and the structure so that the vehicle can move horizontally, vertically, and/or inverted orientations while the magnets provide purchase between the vehicle and the surface.

In certain vehicles, the magnets are incorporated into the wheels of the vehicles. While the wheels can provide sufficient traction for the vehicle to traverse the surface, in certain circumstances, the magnetic wheel can damage the surface due to the material and geometry of the wheel and attractive force from the magnets creating a pressure between the wheel and the surface. Additionally, if the wheels have a fixed geometric relationship to the body of the robot, there can be issues with overcoming obstacles (such as welds beads or similar) due to clearance constraints. Accordingly, a solution to this and other problems is provided by the present invention, as described in more detail herein.

SUMMARY OF THE INVENTION

In one aspect of the invention, a vehicle for traversing a surface using magnetic attachment is provided.

In an embodiment consistent with this aspect of the invention, the vehicle includes a chassis body and wheels attached to the chassis body. A magnetic module is attached via a resilient member to the chassis body. The magnetic module includes a magnet and an offset member that provides an approximately constant offset between the surface and the magnet. The resilient member transfers a magnetic attractive force that is normal to the surface between the magnetic attracting module and the chassis body.

According to a further aspects of the invention, as can be embodied in the same or in one or more additional embodiments of the invention: the offset member is at least one of a wheel, roller, or skid; the vehicle is configured to perform inspection operations; the magnetic module includes a sensor; the magnetic module is configured to further provide locomotive force; the magnetic module is configured to provide a low-friction contact with the surface as the vehicle traverses the surface; the resilient connection is configured to provide an increasing force as the vertical distance increases following a non-linear profile provided via a linkage structure; the magnetic module includes a sensor that measures a force of attraction between the magnetic modules and the surface; the resilient connection includes a sensor that monitors a force between the chassis and the magnetic module; the resilient connection includes a sensor that monitors a position of the chassis relative to the magnetic module; the magnetic module is sized and shaped to have a sloped leading edge to provide a low friction arrangement; the magnetic module includes at least one of a roller or wheel such that a low friction arrangement is provided; the vehicle includes force threshold limiters to prevent unintentional detachment between the vehicle and the surface as a force threshold is approached; the vehicle is configured to navigate curved surfaces while providing sufficient mobility and attractive force to permit traversal of the surface while preventing vehicle detachment from the surface; and the resilient member has an adjustable position with respect to the chassis.

According to further aspects which again can be embodied in one or more embodiments and described above or in a further embodiment, an actuator is included, wherein the actuator is configured to exert a regulator force upon the resilient connection to control of a force or a force profile between the chassis and the magnetic module.

According to still further aspects, which again can be embodied in one or more embodiments and described above or in a further embodiment, each magnetic module includes at least two units, wherein in one unit is position at a front area of the vehicle and the other unit is positioned at a rear area of the vehicle.

These and additional aspects, features and advantages of the invention will be apparent from a review of the accompanying drawing figures and discussion of certain embodiments of the invention.

DETAILED DESCRIPTION CERTAIN OF EMBODIMENTS OF THE INVENTION

Figure 1:
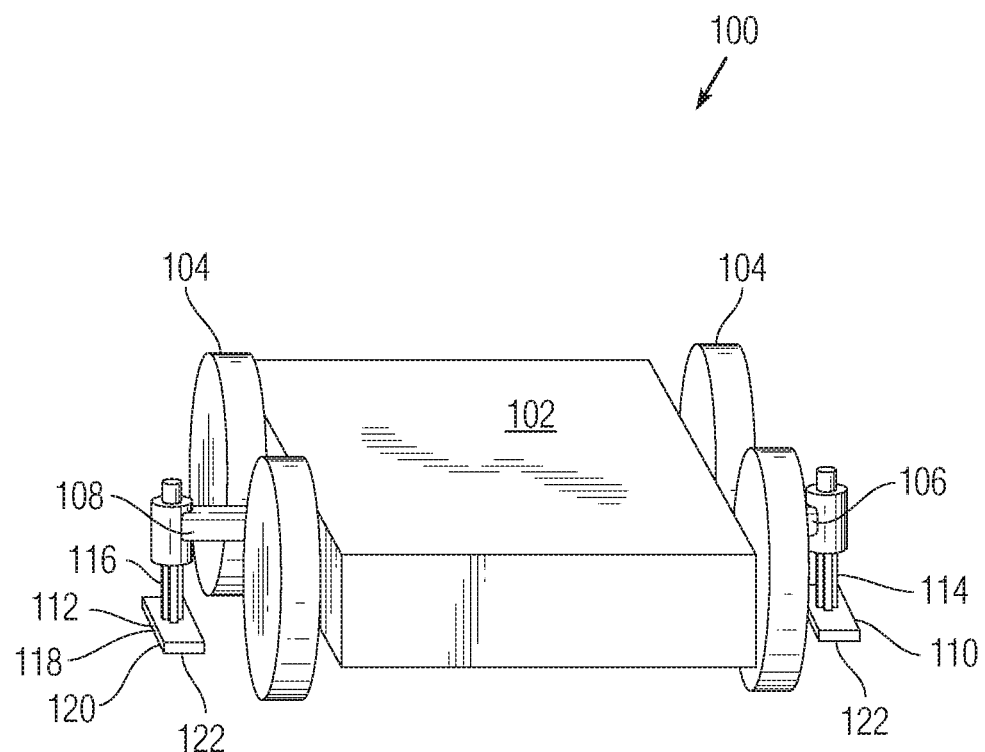
FIG. 1 is an isometric view of a vehicle according to an embodiment of the present invention.
Figure 2:
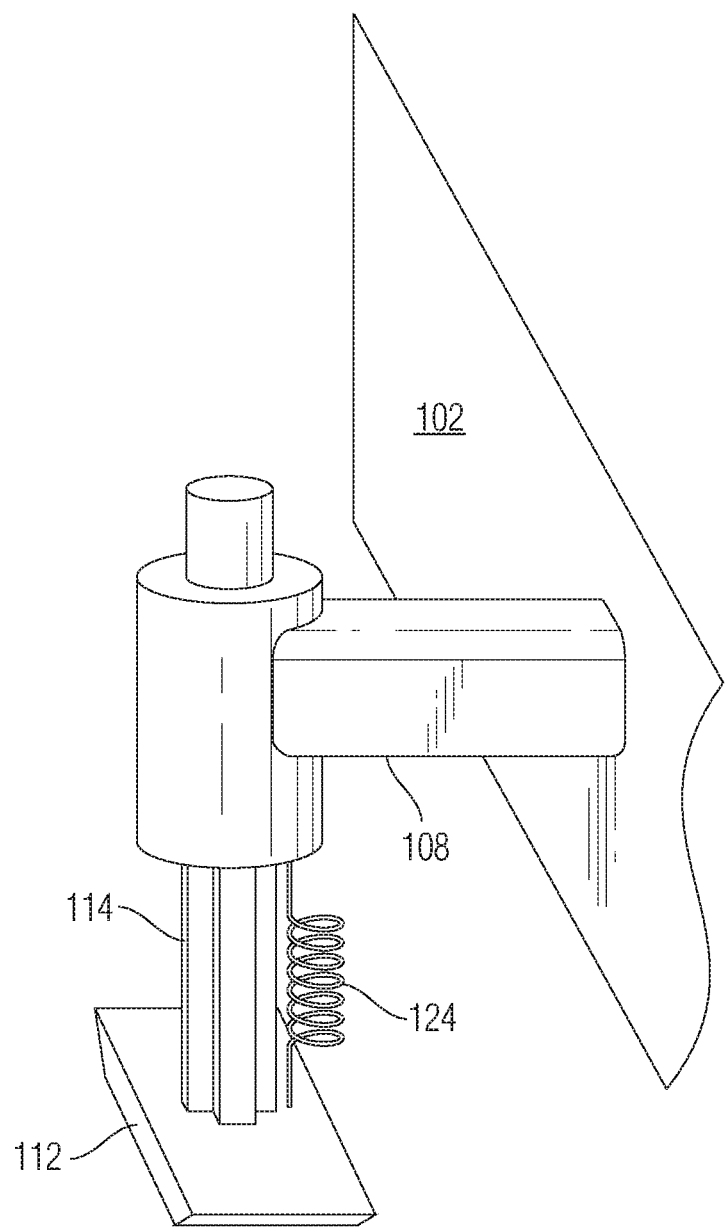
FIG. 2 shows a detailed view of FIG. 1.

Referring to FIGS. 1 and 2, an embodiment is illustrated of a vehicle 100. The vehicle addresses an artifact of the use of magnetic vehicles (scratching of the surface) while simultaneously overcoming issues related to the limited clearance available in previous magnetic vehicles by providing a design in which the chassis is magnetized. By decoupling the spacing of the magnets from the clearance of the vehicle and by designing the magnetic components to easily traverse expected features, such as gaps, welds, offsets, joints, etc., a versatile vehicle can be constructed which does not rely on magnetic wheels, and which does not scratch the surface to be traversed.

The vehicle 100 includes a chassis 102, wheels 104, and side support arms 106 and 108. Side support arms 106 and 108 extend outwardly from the sides of the vehicle 100, for instance, perpendicularly. The side support arms 106, 108 support magnetic modules 110 and 112 via support members 114 and 116. The magnetic modules 110, 112 provide an attractive force with respect to the ferromagnetic surface being traversed that hold the vehicle 100 to the surface.

The magnetic modules 110, 112 include a magnet 118 that can be surrounded by a low friction housing 120. The magnet 118 provides the attractive force and the housing 120 provides a low friction bearing surface that contacts the surface being traversed. The housing 120 provides a smooth, low friction enclosure that contacts the surface so that there is a reduced tendency for the magnetic modules 110, 112 to mar, scratch, or otherwise damage the surface being traversed. The housing can be made from low friction materials, such as, for example, low friction plastics (e.g., PTFE). The housing can also be sized and shaped to reduce friction and enhance mobility, epically over uneven surfaces, such as including sloped and/or rounded faces 122. The sloped faces 122 can be located on the forward and/or aft portions of the surface facing sections of the magnetic modules 110, 122. Other features, such as, for example, roller or wheels can be included with the magnetic modules to further reduce the friction while traversing the surface, as discussed in more detail below. Accordingly, the magnetic modules 110, 112 provide a low-impact structure that provides a magnetic attractive force for maintaining purchase between the vehicle 100 and the surface being traversed. As such, for example, there is a reduced chance of scratching the metal surface and/or removing paint or other protective coating from the outer face of the traversed surface, which could result in degradation and damage to the structure, as compared to vehicles in which the wheels or the construction of the wheels provide the magnetic attractive force.

The magnetic modules 110, 112 are biased toward the traversed surface via the magnets 118 contained therein that provide an attractive force to the surface. The attractive force is transmitted to the vehicle 100 via a resilient member, such as spring 124. The spring 124 provides a biasing force towards the surface so that there is a degree of freedom between the magnetic modules 110, 112 and the chassis 102. As such, when the wheels of the vehicle traverse an uneven area of the surface (e.g., weld bead, step, etc.) the front (or rear) wheels of the vehicle can move up and down over the surface variation. The resilient attachment between the chassis 102 and the magnetic modules 110, 112 permits movement between the chassis and the magnetic modules to account for the uneven surface. Accordingly, the magnetic modules can maintain contact with the surface as the change in height is absorbed by the yield in the resilient member. If the attachment between the magnetic modules 110, 112 and the chassis 102 did not include a resilient member (i.e., a fully rigid connection), there would be a tendency of the chassis to pull the magnetic modules away from the surface and possibly dislodge the magnetic modules from the surface.

As such, the springs 124 ensure that the magnetic modules 110, 112 can maintain contact against the surface while an equal and opposite amount of force sufficient to maintain the vehicle 100 in purchase with the surface being traversed is maintained, even when there are relative changes in height of the chassis with respect to the surface as obstacles are traversed. The springs 124 provide a degree of yield such that as the vehicle traverses uneven areas of the surface, the chassis can move up and down relative to the surface being traversed in corresponding response to the unevenness of the surface, while the magnetic modules 110, 112 maintain contact with the surface. As shown in FIG. 2, the spring 124 extends between the magnetic module 124 and the pillow box bearing of the support arm 108 and provides a tension force that biases the vehicle toward the surface. The spring can also be coiled about the support member 114 and connected between the module and support arm.

The side support arms 106, 108, which include the resilient spring member and the magnetic modules attached thereto, can be repositioned with respect to the vehicle chassis. For example, the side support arms can be dynamically positioned toward a front or a rear end of the vehicle depending on the types of obstacles as they are being encountered during movement of the vehicle. The side support arms can be repositioned individually, such that one support arm is positioned forward and the other support arm is positioned aft, relative to one another on opposite sides of the vehicle. This arrangement can be useful when the vehicle is performing inspections in a helical sweep path. The support arms can be connected to the vehicle chassis via a repositionable connection (e.g., a pivot joint, slide joint, etc.) such that the position of the support arms can be varied, for example, during operations. Actuators or other motors can be used to adjust the position of the support arms based on anticipated obstacle configuration, for example. The position of the support arms can be adjusted by operation of a user input and/or sensors on the vehicle can be used to obtain information about the performance of the vehicle and the position of the arms can be adjusted via an on board processor executing software instructions to send signals to operate the actuators/motors to adjust the arms in response to sensor data.

In certain embodiments of the invention, operation of the resilient spring member can be altered by surrounding structure (e.g., the actuators discussed below, or by a moveable sleeve which can be disposed in surrounding or partial surrounding relation to portions or all of the resilient spring member) or by electrical signals.

The vehicle 100 is designed such that it has a constant distance between the chassis 102 and the surface being traversed (including obstacles), due to the rigid connection between the chassis and the wheels. However, the magnetic modules 110, 112 are free to move normal to the surface with respect to the vehicle, thus allowing the magnetic modules to clear obstacles while maintaining constant attraction to the surface and not pushing the vehicle away from the surface. The modules move separately from the vehicle which provides a degree of yield as the vehicle traverses uneven surfaces and/or as the magnetic modules traverse uneven surfaces.

Figure 3:
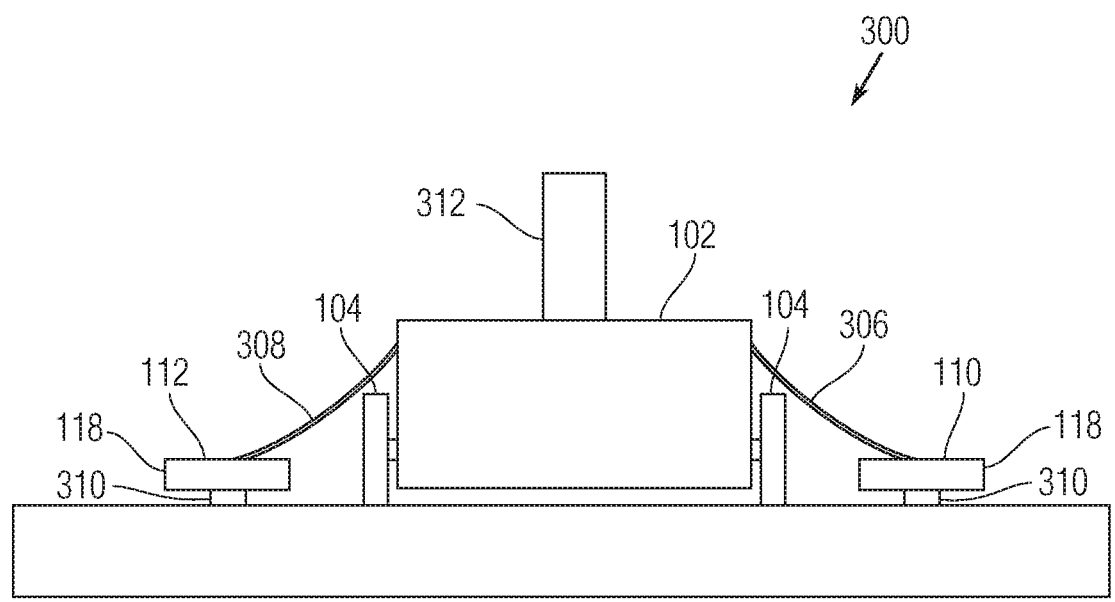
FIG. 3 shows a schematic representation of a vehicle according to another embodiment of the present invention.
Figure 4:
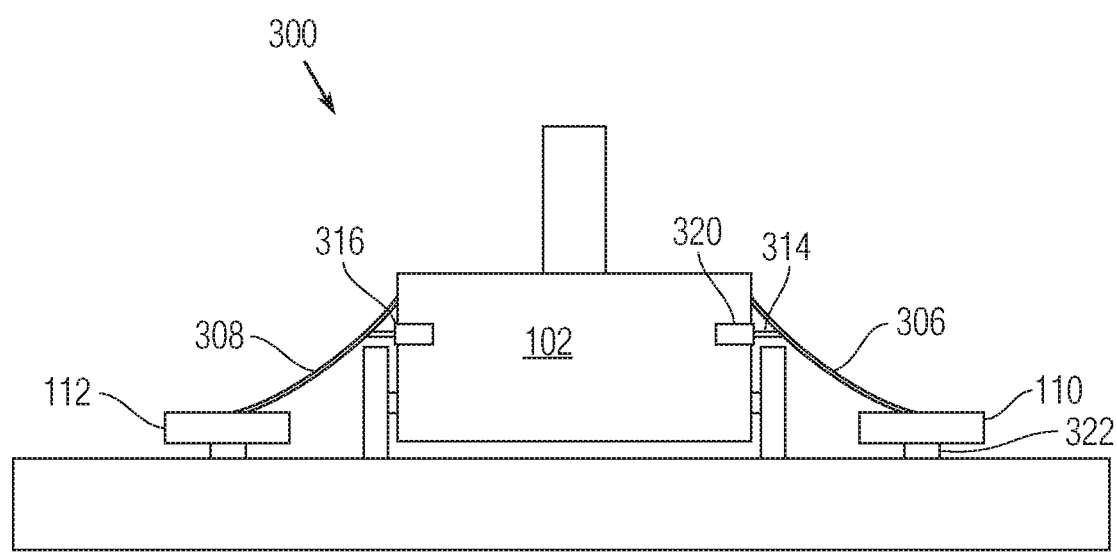
FIG. 4 shows a schematic representation of a vehicle according to another embodiment of the present invention.
Figure 5:
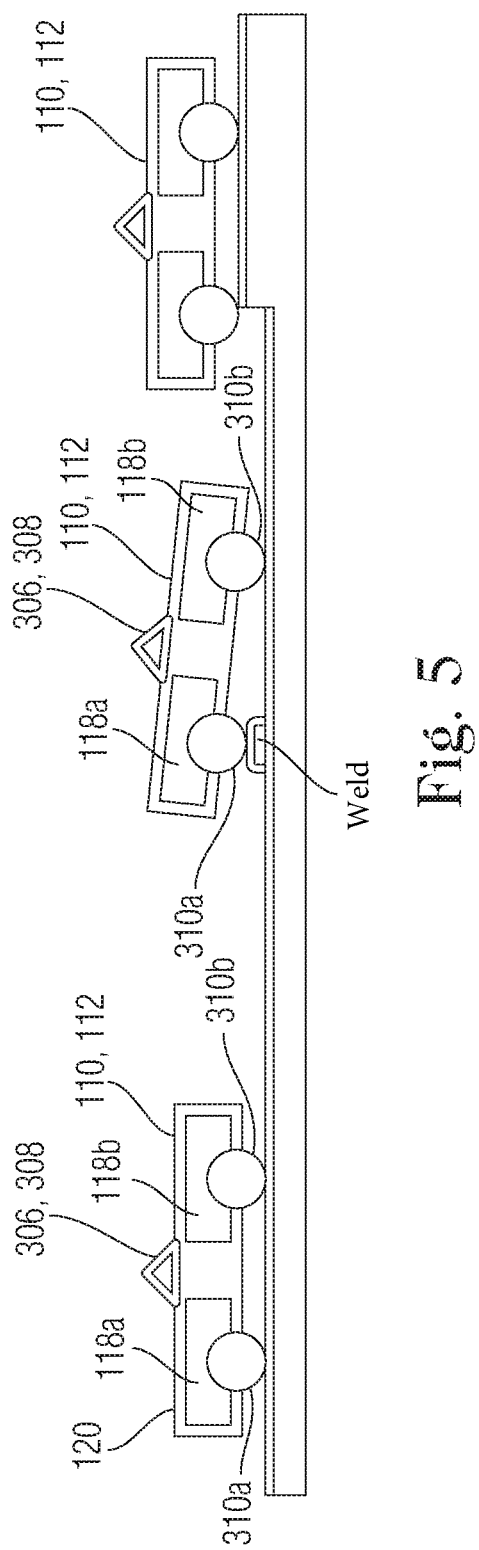
FIG. 5 shows an enlarged schematic representation of a magnetic module of a vehicle according to another embodiment of the present invention.

This allows for sensors and/or other elements on the robot vehicle 100 to retain a fixed geometry relative to the surface being traversed, as this can be highly desirable or necessary in many applications (such as measuring offsets of tank walls in the case of tank calibration). Accordingly, the resilient member (e.g. spring 124) permits the magnetic modules 110, 112 a degree of freedom to adjust to the surface as either the wheels of the vehicle traverse an uneven area or the modules themselves traverse and uneven area. As shown in FIGS. 1 and 2, the resilient member is shown as a coil spring 124. As shown in FIGS. 3-5, as discussed in more detail below, the resilient member can be a leaf spring or sheet of spring steel.

Referring to FIG. 3, the vehicle 300 includes a chassis 102, wheels 104, and magnetic modules 110, 112. Each magnetic module includes at least one magnet 118. In the vehicle 300 shown in FIG. 3, the magnetic modules 110, 112 are connected to the chassis 102 via resilient members 306 and 308. The resilient members 306, 308 can be, for example, sheets of spring steel material. The spring steel material can be sized and shaped as rectangular strips, for example. The spring steel material provides a structural support sufficient to maintain the magnetic modules 110, 112 connected to the chassis 102 while also providing resiliency in a direction normal to the surface being traversed. As such, the resilient members 306, 308 transfer the attractive force between the magnetic modules 110, 112 and the surface to the chassis 102 to provide a downwards (to the surface) force to maintain the wheels 104 in contact with the surface. Similar to as discussed above, the resilient members 306, 308 permit a degree of freedom such that as a wheel of the vehicle traverses a bump, for example, yield in the resilient connection prevents the change in height from acting to dislodge the magnetic modules 110, 112 from the surface, which are attracted by a greater force towards the surface due to their magnetic pull force towards the surface.

Accordingly, the magnetic modules 110, 112 bias the chassis and wheels toward the traversed surface via the resilient members 306, 308. The resilient members 306, 308 provide a biasing force towards the surface so that as the magnetic modules 110, 112 maintain a contact with the surface there is yield in the connection to the chassis to account for surface unevenness while maintaining a downward force against the chassis towards the surface. As such, the resilient members 306, 308 ensure that the chassis and wheels are biased against the surface an equal and opposite amount sufficient to maintain the vehicle 300 in purchase with the surface being traversed while the magnets remain attracted to the surface. However, the resilient members 306, 308 provide a sufficient amount of yield such that as the vehicle traverses uneven areas of the surface, the wheels and chassis can move up and down relative to the magnetic modules 110, 112 (and the surface being traversed) in corresponding response to the unevenness of the surface. In addition, for example, if the surface being traversed includes a weld joint, which provides a local high point on the surface, as the magnetic modules 110, 112 traverse that point they can move up and down as they move over the weld joint (or other surface features such as gap, joints, etc.) as a result of the resilient members 306, 308 providing a degree of freedom between the modules and the chassis while resilient members maintain a resilient biasing force to hold the chassis and wheels in purchase with the surface.

The vehicle 300 is designed such that it has a constant distance between the chassis 102 and the surface being traversed (including obstacles), due to the rigid connection between the chassis and the wheels. However, the magnetic modules 110, 112 are free to move normal to the surface with respect to the vehicle, thus allowing the magnetic modules to clear obstacles while maintaining constant attraction to the surface and not pushing the vehicle away from the surface. The modules move separately from the vehicle which provides a degree of yield between the chassis as they vehicle overcomes obstacles. This configuration allows either the robot or the magnetic modules to roll/slide over weld beads separately, thus overcoming issues with chassis mounted magnets.

The force transmitted through the resilient members should not exceed the magnetic attractive force the modules have with the surface, as this can cause the modules to become detached from the surface. Accordingly, either increasing the size/strength of the magnets or reducing the tension in the resilient member and/or the weight of the robot and forces applied on it can prevent inadvertent detachment.

The disclosed structural arrangement that includes resilient members allows for sensors, such as sensor 312, to retain a fixed geometry relative to the surface being traversed, as this can be highly desirable or necessary in many applications (such as measuring offsets of tank walls in the case of tank calibration).

As shown in FIG. 3, a roller 310 (which can be made from a low friction plastic and can have, for example, a cylindrical or spherical profile) is provided on the bottom surface of the magnetic modules 110, 112. The roller 310 minimizes friction/resistance to the robot traversing the surface. While the magnet 118 provides the attractive force between the surface and the vehicle, the rollers minimize the friction between the magnetic modules 110, 112 and the surface as the vehicle moves across the surface in various directions.

In certain embodiments, the wheels 104 can be driving wheel wherein the vehicle includes motors that can drive the wheels to provide the locomotive force for the vehicle to traverse the surface. In other configurations, the vehicle can be attached to a tether and the vehicle can be dragged across the surface by applying force to the tether. In further arrangements, the magnetic modules 110, 112 can include driving rollers and/or wheels, that can be driven to provide locomotive force to the vehicle. The vehicle can also be configured such that it can incorporate a single magnetic module.

Referring to FIG. 4, the vehicle 300 includes actuators 314, 316 connected to the resilient members 306, 308. The actuators 314, 316 can be a solenoid actuator or other motor attached to the resilient members 306, 308. The actuators 314, 316 can be controlled to vary the force being transferred between the magnetic modules 110, 112 and the chassis 102 via the resilient members 306, 308. For example, the actuators 314, 316 can be actuated to exert and inward or outward force on the resilient members, which can increase or decrease the force transferred. By pressing or pulling on the upper portion of the spring steel, an increase or decrease in the force that is generated between the chassis of the vehicle and the magnetic modules can be obtained. The actuators can also be used to control a force profile that is transferred through the resilient members. The force profile can be controlled to eliminate sharp changes in the magnetic force. The force profile can also be controlled such that at low force levels, a greater amount of flexibility (e.g., bounce) will be permitted, but as the force approaches a force threshold the flexibility in the resilient members can be adjusted.

Moreover, the actuators 314, 316 can be used to monitor (indirectly) the force being transferred through the resilient members by, for example, measuring the amount of force being exerted on the actuators by the resilient members as the vehicle traverses the surface. A pressure sensor 322 can also be included in the magnetic modules 110, 112 that measures a pressure between the magnetic modules (e.g., through the roller) and the surface. Accordingly, the measured pressure can be used to determine the attachment force to the surface, to ensure that the force between the chassis 102 and modules 110, 112 does not exceed a threshold force, which can be equal to the magnetic attachment force between the modules 110, 112 and the surface. Exceeding this threshold can result in a detachment between the modules and the surface, thus resulting in the loss of the attaching force on the vehicle and its subsequent detachment from the surface (i.e. the vehicle is maintains contact with the surface (e.g., in inverted and vertical orientations) due to the attractive force of the magnetic modules to the surface, wherein if modules are dislodged from the surface as they try to keep the vehicle on the surface, then the vehicle will fall as well).

The magnetic modules 110, 112 also provide an opportunity to incorporate sensors that, for example, require contact with the surface being traversed. Sensors can be attached to (e.g., embedded in) the magnetic modules. Communication between these sensors and the body of the robot (e.g., the chassis having a processor, software executing on the processor, memory, and communication modules) can be provided. Including sensors in magnetic modules that do not include a roller can obtain a reasonably high degree of surface contact, which can improve functionality of the sensors.

Referring to FIG. 5, a detailed view of an arrangement of the magnetic modules 110, 112 is provided. In certain arrangement, the modules can include a single magnet, enclosed in a housing, and a roller, or, as shown in FIG. 5, the modules 110, 112 can include at least two magnets 118a and 118b, enclosed in a housing 120, and two rollers 310a and 310b. The module includes of first and second magnets 118a, 118b and first and second rollers 310a, 310b. The magnets and rollers can be located forward and aft of the module with respect to the direction of travel over the surface. Having two magnets and two rollers offers advantages as the modules traverse uneven areas of the surface (e.g., caused by weld beads, joints, steps, gaps, etc. in the surface). In order to assist in overcoming issues that can arise when trying to overcome a 'bump' in the surface, which can include a spike in potential energy as a result of the differing heights when the magnet has to move away from the surface as the bump is traversed. Bumps in the potential energy can occur while traversing weld beads, or, more significantly, where the vehicle has to traverse a drop or gap in the surface. In this case, from the magnet's perspective, the magnet has to "pull" itself away from the surface before being able to drop down to the lower surface. By strategically placing the magnets to minimize this effect, it becomes easier to traverse such obstacles. With only one magnet, this becomes more difficult as opposed to two, because with two magnets, one remains firmly attached while the other traverses the obstacle, thus minimizing the reduction in attraction and the correlated resistance of the magnet to effectively move 'away' from the surface. Moreover, as one of the two rollers traverses the surface height change, the magnetic module rotates. Having a rotational degree of freedom can be beneficial as it helps to maintain as lease one of the magnets in optimal attachment condition (e.g., engaged with a flat surface area). The module can rotate about the attachment point of the resilient member 306, 308 to the module, which provides the normal (vertical with respect to surface) degree of freedom between the magnetic attachment modules and the vehicle.

Accordingly, a vehicle that maintains purchase with a surface via magnetic modules is provided. The magnetic modules are connected to the chassis of the vehicle via resilient members that permit the modules to move in at last one degree of freedom with respect to the rest of the vehicle and essentially normal to the surface. As such, as the vehicle can traverse uneven areas of the surface with minimal disturbance to the vehicle, which can be important for maintaining sensors at a constant height with respect to the surface, for example. The resilient members further allow the magnets to "flex" so as to reduce potential damage caused by the magnets engaged with the surface. Accordingly, significant advantages over traditional robotic systems are provided.

It should be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the invention.

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

The invention claimed is:

1. A vehicle for traversing a surface using a magnetic attachment, comprising:
    a chassis body;
    wheels coupled to the chassis body;
    a magnetic module coupled to the chassis body such that the magnetic module is permitted to move separately from the chassis body; and
    a spring coupled to the magnetic module and the chassis body,
    wherein the magnetic module includes:
        a magnet; and
        an offset member that provides an approximately constant offset between the surface and the magnet;
    further wherein the spring transfers a magnetic attractive force that is normal to the surface between the magnetic attracting module and the chassis body.

2. The vehicle according to claim 1, wherein the offset member is at least one of a wheel, roller, or skid.

3. The vehicle according to claim 1, wherein the vehicle is configured to perform inspection operations.

4. The vehicle according to claim 1, wherein the magnetic module includes a sensor.

5. The vehicle according to claim 1, wherein the magnetic module is configured to further provide locomotive force.

6. The vehicle according to claim 1, wherein the magnetic module is configured to provide a low-friction contact with the surface as the vehicle traverses the surface.

7. The vehicle according to claim 1, wherein the spring is configured to provide an increasing force as the vertical distance increases following a non-linear profile provided via a linkage structure.

8. The vehicle according to claim 1, wherein the magnetic module includes a sensor that measure a force of attraction between the magnetic modules and the surface.

9. The vehicle according to claim 1, further comprising w a sensor that monitors a force between the chassis and the magnetic module.

10. The vehicle according to claim 1, further comprising a sensor that monitors a position of the chassis relative to the magnetic module.

11. The vehicle according to claim 1, wherein the magnetic module includes at least one of a roller or wheel such that a low friction arrangement is provided.

12. The vehicle according to claim 1, wherein the vehicle includes force threshold limiters to prevent unintentional detachment between the vehicle and the surface as a force threshold is approached.

13. The vehicle according to claim 1, wherein the vehicle is configured to navigate curved surfaces while providing sufficient mobility and attractive force to permit traversal of the surface while preventing vehicle detachment from the surface.

14. The vehicle according to claim 1, wherein the magnetic module includes at least two units, wherein in one unit is position at a front area of the vehicle and the other unit is positioned at a rear area of the vehicle.

15. The vehicle according to claim 1, wherein the spring has an adjustable position with respect to the chassis body.

16. The vehicle according to claim 1,
    wherein the chassis body comprises a support arm, and
    further wherein the magnetic module is coupled to the chassis body via the support arm.

17. The vehicle according to claim 16, wherein the spring extends between the magnetic module and the support arm.

18. The vehicle according to claim 16, further comprising:
    a support member coupled to the magnetic module,
    wherein the support arm comprises a pillow box bearing that is configured to receive the support member.

19. The vehicle according to claim 16, further comprising:
    a support member coupled to the magnetic module,
    wherein the spring is coiled about the support member and connected between the magnetic module and support arm.

20. The vehicle according to claim 1, wherein the spring provides a biasing force toward the surface, thereby enabling the magnetic module to maintain contact against the surface as the vehicle traverses obstacles on the surface.

21. The vehicle according to claim 1, further comprising:
    an actuator coupled to the spring, wherein the actuator is controllable to vary a force transferred between the magnetic module and the chassis body via the spring.

22. The vehicle according to claim 21, wherein the actuator is configured to exert an inward or outward force on the spring, thereby increasing or decreasing the force transferred between the magnetic module and the chassis body via the spring.

23. The vehicle according to claim 21, wherein the actuator is configured to monitor the force transferred between the magnetic module and the chassis body via the spring.

24. The vehicle according to claim 23, further comprising:
a pressure sensor coupled to the magnetic module, wherein the pressure sensor is configured to measure a pressure between the magnetic module and the surface.

25. The vehicle according to claim 24,
wherein the actuator is configured to operate in response to the measured pressure between the magnetic module and the surface to ensure that a force between the chassis body and magnetic module does not exceed a threshold force.

26. The vehicle accordingly to claim 25, wherein the threshold force is equal to the pressure between the magnetic module and the surface.

27. A vehicle for traversing a surface using magnetic attachment, comprising:
a chassis body;
wheels attached to the chassis body;
a magnetic module attached via a resilient member to the chassis body; and
an actuator, wherein the actuator is configured to exert a regulator force upon the resilient member to control a force or a force profile between the chassis and the magnetic module
wherein the magnetic module includes:
a magnet; and
an offset member that provides an approximately constant offset between the surface and the magnet,
wherein the resilient member transfers a magnetic attractive force that is normal to the surface between the magnetic attracting module and the chassis body.

28. A vehicle for traversing a surface using magnetic attachment, comprising:
a chassis body;
wheels attached to the chassis body; and
a magnetic module attached via a resilient member to the chassis body,
wherein the magnetic module includes:
a magnet; and
an offset member that provides an approximately constant offset between the surface and the magnet,
wherein the resilient member transfers a magnetic attractive force that is normal to the surface between the magnetic attracting module and the chassis body, and
wherein the magnetic module is sized and shaped to have a sloped leading edge to provide a low friction arrangement.

* * * * *

UNITED STATES PATENT AND TRADEMARK OFFICE
CERTIFICATE OF CORRECTION

PATENT NO. : 10,829,171 B2  
APPLICATION NO. : 16/017546  
DATED : November 10, 2020  
INVENTOR(S) : Brian Parrott Page 1 of 1

It is certified that error appears in the above-identified patent and that said Letters Patent is hereby corrected as shown below:

On the Title Page

(72) Inventor, "Brian M. Parrott" should read --Brian Parrot--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*